US010247866B2

(12) United States Patent
Yamagata et al.

(10) Patent No.: US 10,247,866 B2
(45) Date of Patent: Apr. 2, 2019

(54) IMAGING DEVICE

(71) Applicant: Panasonic Intellectual Property Management Co., Ltd., Osaka (JP)

(72) Inventors: Michihiro Yamagata, Osaka (JP); Tsuguhiro Korenaga, Osaka (JP); Norihiro Imamura, Osaka (JP); Takamasa Ando, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/361,779

(22) Filed: Nov. 28, 2016

(65) Prior Publication Data
US 2017/0075050 A1 Mar. 16, 2017

Related U.S. Application Data

(63) Continuation of application No. 14/112,799, filed as application No. PCT/JP2013/000563 on Feb. 1, 2013, now abandoned.

(30) Foreign Application Priority Data

Feb. 2, 2012 (JP) .................................. 2012-021026

(51) Int. Cl.
*G02B 5/30* (2006.01)
*G02B 3/00* (2006.01)
(Continued)

(52) U.S. Cl.
CPC .......... *G02B 5/3025* (2013.01); *G01J 1/0411* (2013.01); *G01J 1/0429* (2013.01);
(Continued)

(58) Field of Classification Search
CPC .... G02B 5/3025; G02B 3/0006; G02B 13/22; H04N 9/045; H04N 5/2254; G01J 1/4228;
(Continued)

(56) References Cited

U.S. PATENT DOCUMENTS 5,076,687 A 12/1991 Adelson
8,768,102 B1 7/2014 Ng
(Continued)

FOREIGN PATENT DOCUMENTS

JP 2004-048702 A 2/2004
JP 2006-254331 A 9/2006
(Continued)

OTHER PUBLICATIONS

Co-pending U.S. Appl. No. 14/112,799, filed Oct. 18, 2013 (application provided).

(Continued)

*Primary Examiner* — Mekonnen D Dagnew
(74) *Attorney, Agent, or Firm* — Renner Otto Boisselle & Sklar, LLP

(57) ABSTRACT

An image capture device according to the present disclosure includes: a lens optical system L; an image sensor N on which light that has passed through the lens optical system L is incident and which includes at least a plurality of first pixels and a plurality of second pixels; and an array of optical elements K which is arranged between the lens optical system and the image sensor. The lens optical system has a first optical region D1 which transmits mostly light vibrating in the direction of a first polarization axis and a second optical region D2 which transmits mostly light vibrating in the direction of a second polarization axis that is different from the direction of the first polarization axis. The array of optical elements makes the light that has passed through the first optical region D1 incident on the plurality of first pixels and also makes the light that has passed through the second optical region D2 incident on the plurality of second pixels.

8 Claims, 12 Drawing Sheets

(51) Int. Cl.
  *G03B 11/00*   (2006.01)
  *G01J 1/04*    (2006.01)
  *G01J 4/04*    (2006.01)
  *G01J 1/42*    (2006.01)
  *G02B 13/22*   (2006.01)
  *H04N 5/225*   (2006.01)
  *H04N 9/04*    (2006.01)

(52) U.S. Cl.
  CPC ............. *G01J 1/4228* (2013.01); *G01J 4/04* (2013.01); *G02B 3/0006* (2013.01); *G02B 13/22* (2013.01); *G03B 11/00* (2013.01); *H04N 5/2254* (2013.01); *H04N 9/045* (2013.01)

(58) Field of Classification Search
  CPC .......... G01J 4/04; G01J 1/0411; G01J 1/0429; G03B 11/00
  See application file for complete search history.

(56) References Cited

U.S. PATENT DOCUMENTS

| | | | |
|---|---|---|---|
| 9,239,514 B2 | 1/2016 | Baba | |
| 2001/0033326 A1 | 10/2001 | Goldstein | |
| 2002/0054208 A1* | 5/2002 | Goldstein | G02B 21/22 348/59 |
| 2002/0154215 A1 | 10/2002 | Schechterman | |
| 2003/0214497 A1 | 11/2003 | Morishima et al. | |
| 2006/0209292 A1 | 9/2006 | Dowski, Jr. | |
| 2008/0266655 A1 | 10/2008 | Levoy et al. | |
| 2008/0291311 A1 | 11/2008 | Kusaka | |
| 2009/0167922 A1 | 7/2009 | Perlman | |
| 2009/0278966 A1 | 11/2009 | Kusaka | |
| 2009/0315993 A1 | 12/2009 | Hirai | |
| 2010/0128152 A1 | 5/2010 | Hayasaka et al. | |
| 2010/0171854 A1 | 7/2010 | Yokogawa | |
| 2010/0189341 A1 | 7/2010 | Oota et al. | |
| 2010/0303344 A1 | 12/2010 | Sato | |
| 2011/0033177 A1 | 2/2011 | Kuroki | |
| 2011/0316983 A1 | 12/2011 | Hiramoto et al. | |
| 2012/0112037 A1 | 5/2012 | Hiramoto et al. | |
| 2012/0212587 A1* | 8/2012 | Otani | G03B 35/10 348/49 |
| 2013/0027557 A1 | 1/2013 | Hirai | |
| 2013/0063569 A1 | 3/2013 | Sato | |
| 2013/0070146 A1 | 3/2013 | Imamura | |
| 2013/0075585 A1 | 3/2013 | Kobayashi | |
| 2013/0083172 A1 | 4/2013 | Baba | |
| 2013/0136306 A1* | 5/2013 | Li | G02B 27/28 382/103 |
| 2013/0141634 A1 | 6/2013 | Korenaga | |
| 2013/0145608 A1 | 6/2013 | Ando | |
| 2013/0188023 A1 | 7/2013 | Kuang | |
| 2013/0215299 A1 | 8/2013 | Imamura | |
| 2013/0235256 A1 | 9/2013 | Kodama | |
| 2013/0270421 A1 | 10/2013 | Kanamori | |
| 2013/0293704 A1 | 11/2013 | Imamura | |
| 2013/0329042 A1 | 12/2013 | Murata | |
| 2013/0341493 A1 | 12/2013 | Ando | |
| 2014/0028825 A1 | 1/2014 | Yamagata | |
| 2014/0055661 A1 | 2/2014 | Imamura | |
| 2014/0055664 A1 | 2/2014 | Yamagata | |
| 2014/0071247 A1 | 3/2014 | Imamura | |
| 2014/0092227 A1 | 4/2014 | Kanamori | |
| 2015/0156478 A1 | 6/2015 | Ono | |
| 2015/0212294 A1 | 7/2015 | Imamura | |

FOREIGN PATENT DOCUMENTS

| | | |
|---|---|---|
| JP | 2008-015157 A | 1/2008 |
| JP | 2010-025915 A | 2/2010 |
| JP | 2010-154171 A | 7/2010 |
| JP | 2010-194296 A | 9/2010 |
| JP | 2011-062378 A | 3/2011 |
| JP | 2011-206334 A | 10/2011 |
| JP | 2012-010757 A | 1/2012 |
| JP | 2012-247644 A | 12/2012 |

OTHER PUBLICATIONS

International Search Report for corresponding International Application No. PCT/JP2013/000563 dated Apr. 23, 2013.
Form PCT/ISA/237 for corresponding International Application No. PCT/JP2013/000563 dated Apr. 23, 2013 and partial English translation.
Notice of Reasons for Rejection dated Nov. 11, 2014 for corresponding Japanese Application No. 2013-556272.

\* cited by examiner (a)

(b-1)

(b-2)

IMAGING DEVICE

TECHNICAL FIELD

The present application relates to an image capture device such as a camera and more particularly relates to an image capture device which captures an image using polarized light.

BACKGROUND ART

When light is reflected from the surface of an object, the polarization property of the light changes. That is why the light reflected from the object has its polarization property determined by various pieces of information including the surface roughness, reflectance, and birefringence of the object and the orientation of the reflective surface. Thus, if light with a polarization property is separated, detected and converted into an electrical signal, those pieces of information can be obtained.

A shooting system of that type is generally used as means for imaging separately light that has been reflected from the surface of a tissue and light that has been reflected from inside of the tissue in a camera for medical and beauty treatment purposes such as an endoscope and a skin checker.

In order to detect light with a polarization property, according to a conventional method, a polarizer is arranged in front of the lens of a image capturing camera and a shooting session is carried out with the polarizer rotated according to the shooting condition. According to such a method, however, shooting sessions need to be performed a number of times with the polarizer rotated, thus taking a long time to get an image.

Thus, to overcome such a problem, some people proposed a method for getting an image using light with a different polarization property by arranging a polarizer having an axis of polarization in a predetermined direction in advance on the surface of an image sensor. For example, a Patent Document No. 1 discloses a device in which polarization filters are provided for some of the pixels of a solid-state image sensor. By making light with a polarization property incident on some pixels and by performing image processing on an image obtained from those pixels on which the light with a polarization property has been incident and an image obtained from other pixels, an image, from which the influence of reflection from the surface of the subject has been reduced, can be obtained.

Meanwhile, Patent Document No. 2 discloses an image capture device in which an optical system is formed by an array of two lenses and an image is shot through each of those lenses using light with a different polarization direction, thereby detecting the state of a dry or wet road surface.

CITATION LIST

Patent Literature

Patent Document No. 1: Japanese Laid-Open Patent Publication No. 2006-254331
Patent Document No. 2: Japanese Laid-Open Patent Publication No. 2010-25915

SUMMARY OF INVENTION

Technical Problem

However, there is a growing demand for an image capture device which can obtain a plurality of images based on multiple light beams in mutually different polarization states using a more simplified or more general configuration than the conventional ones.

A non-limiting exemplary embodiment of the present application provides an image capture device which can obtain a plurality of images based on multiple light beams in mutually different polarization states using a simplified or general configuration.

Solution to Problem

An image capture device according to an aspect of the present invention includes: a lens optical system; an image sensor on which light that has passed through the lens optical system is incident and which includes at least a plurality of first pixels and a plurality of second pixels; and an array of optical elements which is arranged between the lens optical system and the image sensor and which includes a plurality of optical elements, each having a lens surface. The lens optical system has a first optical region which transmits mostly light vibrating in the direction of a first polarization axis and a second optical region which transmits mostly light vibrating in the direction of a second polarization axis that is different from the direction of the first polarization axis. Each of the optical elements that form the array of optical elements makes the light that has passed through the first optical region incident on the plurality of first pixels and also makes the light that has passed through the second optical region incident on the plurality of second pixels.

Advantageous Effects of Invention

An image capture device according to an aspect of the present invention can capture multiple images based on light beams in mutually different polarization states while using a single lens optical system.

In addition, by adopting the image capture device of the present invention, a biometric image capture device, which may be used effectively to check the skin state, for example, is realized.

DESCRIPTION OF EMBODIMENTS

Figure 1:
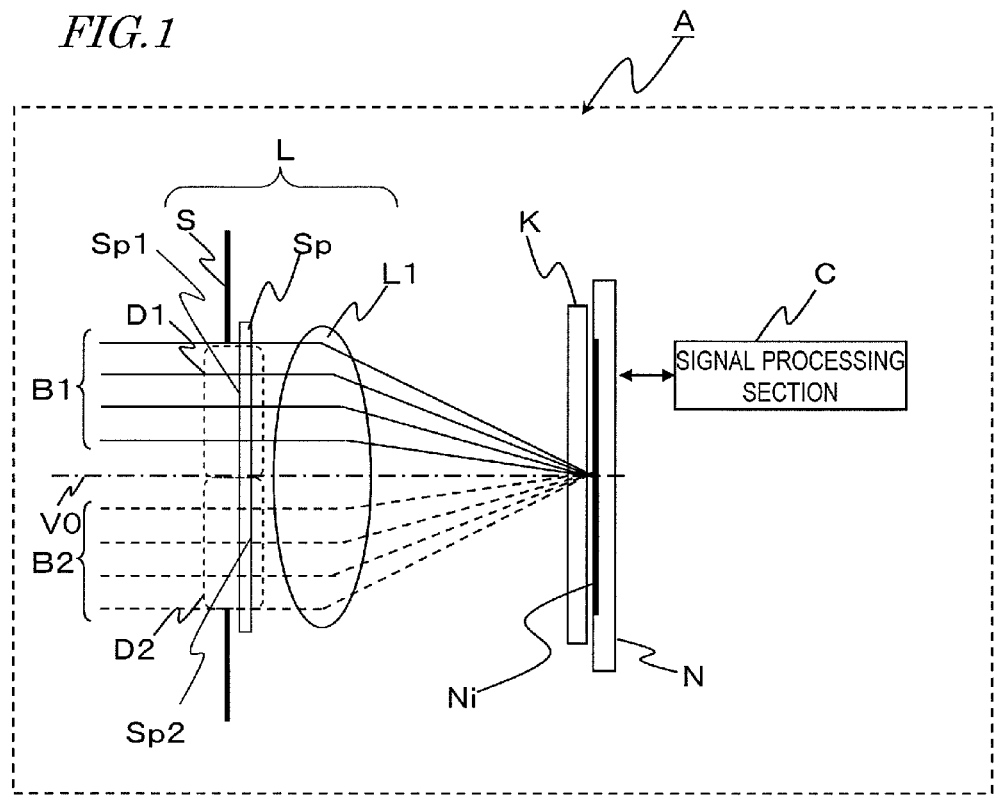
FIG. 1 Illustrates a configuration for a first embodiment of an image capture device according to the present invention.

The present inventors checked out the image capture devices disclosed in Patent Documents Nos. 1 and 2. As a result, we reached the following conclusion. Specifically, the device disclosed in Patent Document No. 1 needs to use a dedicated image sensor with a polarization filter. However, since such an image sensor is not retailed, it must be manufactured as a dedicated product. Particularly if such dedicated products are manufactured in small quantities, the manufacturing cost is expensive. On top of that, in that case, the arrangement of the polarizer cannot be changed appropriately according to the shooting situation.

On the other hand, in the device disclosed in Patent Document No. 2, an optical system is implemented as a lens array on the image sensor. According to such an arrangement, the effective diameter of a single optical system needs to be less than a half of the size of the image capturing area, thus limiting the degree of freedom of the optical design. That is why it is difficult to form an optical system, of which the resolution is high enough to obtain an image.

In order to overcome these problems, the present inventors invented a novel image capture device which can obtain an image by using light with a polarization property. An aspect of the present invention can be outlined as follows.

An image capture device according to an aspect of the present invention includes: a lens optical system; an image sensor on which light that has passed through the lens optical system is incident and which includes at least a plurality of first pixels and a plurality of second pixels; and an array of optical elements which is arranged between the lens optical system and the image sensor and which includes a plurality of optical elements, each having a lens surface. The lens optical system has a first optical region which transmits mostly light vibrating in the direction of a first polarization axis and a second optical region which transmits mostly light vibrating in the direction of a second polarization axis that is different from the direction of the first polarization axis. Each of the optical elements that form the array of optical elements makes the light that has passed through the first optical region incident on the plurality of first pixels and also makes the light that has passed through the second optical region incident on the plurality of second pixels.

The image sensor may be a monochrome image sensor.

The lens optical system may be an image-space telecentric optical system.

The lens optical system may include a split polarizer having first and second polarizing portions which are located in the first and second regions, respectively.

The optical elements that form the array of optical elements may be a lenticular lens.

In the image sensor, a number of the first pixels and a number of the second pixels may be arranged in a first direction and the first pixels arranged in the first direction and the second pixels arranged in the first direction may alternate with each other in a second direction that intersects with the first direction at right angles, thus forming an image capturing plane.

The lens optical system may further have a third optical region which transmits mostly light vibrating in the direction of a third polarization axis and a fourth optical region which transmits mostly light vibrating in the direction of a fourth polarization axis. The split polarizer may further have third and fourth polarizing portions which are located in the third and fourth regions, respectively.

The optical elements that form the array of optical elements may be a micro lens array.

The image capture device may further include a polarization direction changing section which changes the direction of at least one of the first and second polarization axes of the first and second optical regions.

The lens optical system may include a split polarizer with at least three polarizing portions, two adjacent ones of which have polarization axes in mutually different directions. The image capture device may further include a drive mechanism which drives the split polarizer so that any two adjacent ones of the at least three polarizing portions of the split optical element are located in the first and second regions.

The split polarizer may include a common transparent electrode, two divided transparent electrodes which are located in the first and second optical regions, respectively, a liquid crystal layer which is interposed between the common transparent electrode and the two divided transparent electrodes, and a control section which applies mutually different voltages to the two divided transparent electrodes.

The image capture device may perform shooting sessions multiple times with the voltage changed.

The plurality of first pixels may include a number of 1A pixels with filters having a first spectral transmittance characteristic, a number of 2A pixels with filters having a second spectral transmittance characteristic, a number of 3A pixels with filters having a third spectral transmittance characteristic, and a number of 4A pixels with filters having a fourth spectral transmittance characteristic. The plurality of second pixels may include a number of 1B pixels with filters having the first spectral transmittance characteristic, a number of 2B pixels with filters having the second spectral transmittance characteristic, a number of 3B pixels with filters having the third spectral transmittance characteristic, and a number of 4B pixels with filters having the fourth spectral transmittance characteristic. The array of optical elements may include: a plurality of first optical elements which makes light that has passed through the first optical region incident on the 1A and 3A pixels and which also makes light that has passed through the second region incident on the 2B and 4B pixels; and a plurality of second optical elements which makes light that has passed through the first region incident on the 2A and 4A pixels and which also makes light that has passed through the second region incident on the 1B and 3B pixels.

On the image capturing plane of the image sensor, the 1A, 2B, 3A and 4B pixels that form a single set may be adjacent to each other and may be arranged at the four vertices of a quadrangle.

The filters having the first spectral transmittance characteristic and the filters having the second spectral transmittance characteristic may transmit light falling within the wavelength range of the color green. The filters having the third spectral transmittance characteristic may transmit light falling within the wavelength range of the color red. The filters having the fourth spectral transmittance characteristic may transmit light falling within the wavelength range of the color blue. And 1A, 2B, 3A and 4B pixels that form a single set may be arranged in a Bayer arrangement pattern.

The plurality of first optical elements and the plurality of second optical elements may form a lenticular lens.

The lens optical system may further include a stop, and the first and second optical regions may be located in the vicinity of the stop.

An image capture device according to another aspect of the present invention includes: a lens optical system; an image sensor which includes a plurality of first pixels with filters having a first spectral transmittance characteristic, a plurality of second pixels with filters having a second spectral transmittance characteristic, a plurality of third pixels with filters having a third spectral transmittance characteristic, and a plurality of fourth pixels with filters having a fourth spectral transmittance characteristic and in which a first row where the first and second pixels are arranged alternately in a first direction and a second row where the third and fourth pixels are arranged alternately in the first direction alternate in a second direction, thereby forming an image capturing plane, wherein light that has passed through the lens optical system is incident on the first, second, third and fourth pixels; and an array of optical elements which is arranged between the lens optical system and the image sensor. The lens optical system has a first optical region which transmits mostly light vibrating in the direction of a first polarization axis and a second optical region which transmits mostly light vibrating in the direction of a second polarization axis that is different from the direction of the first polarization axis. The first and second optical regions are arranged in the second direction. On the image capturing plane, the array of optical elements includes a plurality of optical elements, each of which makes the light that has been transmitted through the lens optical system incident on every four pixels, which are the first, second, third and fourth pixels that are arranged adjacent to each other in the first and second directions. The plurality of optical elements forms a number of columns, each of which is arranged linearly in the second direction. On two columns that are adjacent to each other in the first direction, each optical element on one of the two columns is shifted from an associated optical element on the other column in the second direction by a length corresponding to a half of one arrangement period of the optical elements.

A biometric image capturing system according to an aspect of the present invention includes: an image capture device according to any of the embodiments described above; and a light source which irradiates an object with polarized light.

The lens optical system of the image capture device may include split color filters to be arranged in the first to fourth optical regions. The split color filters may transmit light falling within the same wavelength range in two of those first through fourth optical regions. And in the two optical regions, the polarization axes of the split polarizer may be in mutually different directions.

In the two optical regions, the directions of the polarization axes of the split polarizer may intersect with each other at substantially right angles.

The biometric image capturing system may further include a control section which controls the light source and the image capture device. The control section may control the image capture device so that the image capture device captures multiple images synchronously with flickering of the light source. And the image capture device may perform arithmetic processing between the multiple images to generate another image.

The biometric image capturing system may further include a display section which displays an image that has been shot by the image capture device. The image capture device may further include a signal processing section. The signal processing section may generate an image signal by inverting horizontally the image shot and may output the image signal to the display section.

Hereinafter, embodiments of an image capture device according to the present invention will be described with reference to the accompanying drawings.

(Embodiment 1)

FIG. 1 is a schematic representation illustrating a first embodiment of an image capture device according to the present invention. The image capture device A of this embodiment includes a lens optical system L, of which the optical axis is identified by V0, an array of optical elements K which is arranged in the vicinity of the focal point of the lens optical system L, an image sensor N, and a signal processing section C.

In this embodiment, the lens optical system L includes a stop S and an objective lens L1 which images light that has passed through the stop S onto the image sensor. The lens optical system L has a first optical region D1 and a second optical region D2. The first and second optical regions D1 and D2 are located in the vicinity of the stop S. The region obtained by combining these first and second optical receives D1 and D2 together has a circular shape corresponding to the aperture of the stop S on a cross section which intersects with the optical axis V0 at right angles. The boundary between the first and second optical regions D1 and D2 includes the optical axis V0 and is located on a plane which is parallel to the horizontal direction.

The first optical region D1 of the lens optical system L is configured to transmit mostly light vibrating in the direction of a first polarization axis, and the second optical region D2 is configured to transmit mostly light vibrating in the direction of a second polarization axis that is different from the direction of the first polarization axis.

Figure 2:
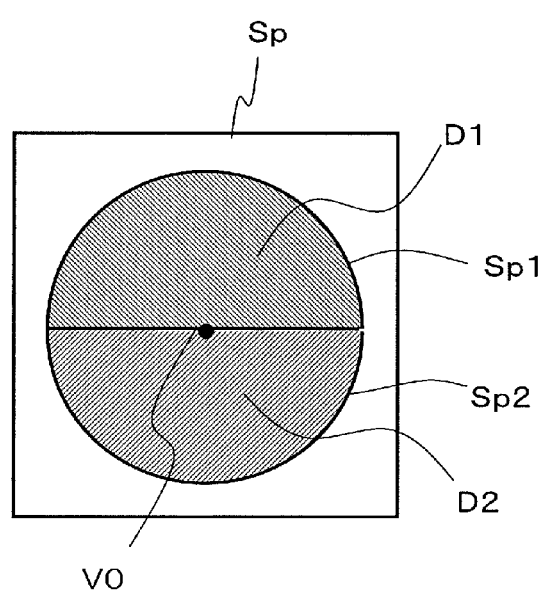
FIG. 2 A front view of a split polarizer according to the first embodiment.

In this embodiment, the lens optical system L includes a split polarizer Sp which is located in the first and second optical regions D1 and D2. FIG. 2 is a front view of the split polarizer Sp. The split polarizer Sp divides the aperture of the stop S into two regions by a line that includes the optical axis V0 of the lens optical system L and that is parallel to the horizontal direction of the image capture device, and includes a first polarizing portion Sp1 located in the first optical region D1 and a second polarizing portion Sp2 located in the second optical region. The first and second polarizing regions Sp1 and Sp2 are implemented as respective polarizers. As each of those polarizers, a so-called "PVA iodine stretched film" which is made by dyeing polyvinyl alcohol with iodine and stretching it into a film may be used.

The first and second polarizing sections Sp1 and Sp2 have first and second polarization axes, respectively, and the directions of the first and second polarization axes are different from each other. For example, the direction of the first polarization axis may be the vertical direction of the image capture device, and the second polarization direction may be the horizontal direction of the image capture device.

As shown in FIG. 1, of the light entering the stop S, the light beam B1 enters the first polarizing portion Sp1 of the split polarizer Sp and the light beam B2 enters the second polarizing portion Sp2 of the split polarizer Sp. If the light entering the stop S includes linearly polarized light rays which are polarized in an arbitrary direction, then only linearly polarized light rays vibrating in the direction of the first polarization axis are transmitted through the first polarizing portion Sp1 and only linearly polarized light rays vibrating in the direction of the second polarization axis are transmitted through the second polarizing portion Sp2. The light beams B1 and B2 are converged by the objective lens L1 and incident on the array of optical elements K.

Figure 3:
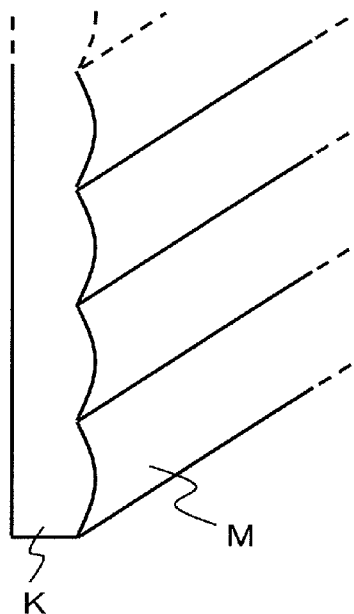
FIG. 3 A perspective view of an array of optical elements according to the first embodiment.

FIG. 3 is a perspective view of the array of optical elements K, which includes a plurality of optical elements M, each having a lens face. In this embodiment, the lens face of each optical element M is a cylindrical face. In this array of optical elements K, the optical elements M are arranged vertically so that their cylindrical faces run in the horizontal direction. In this manner, these optical elements M form a lenticular lens.

Figure 4:
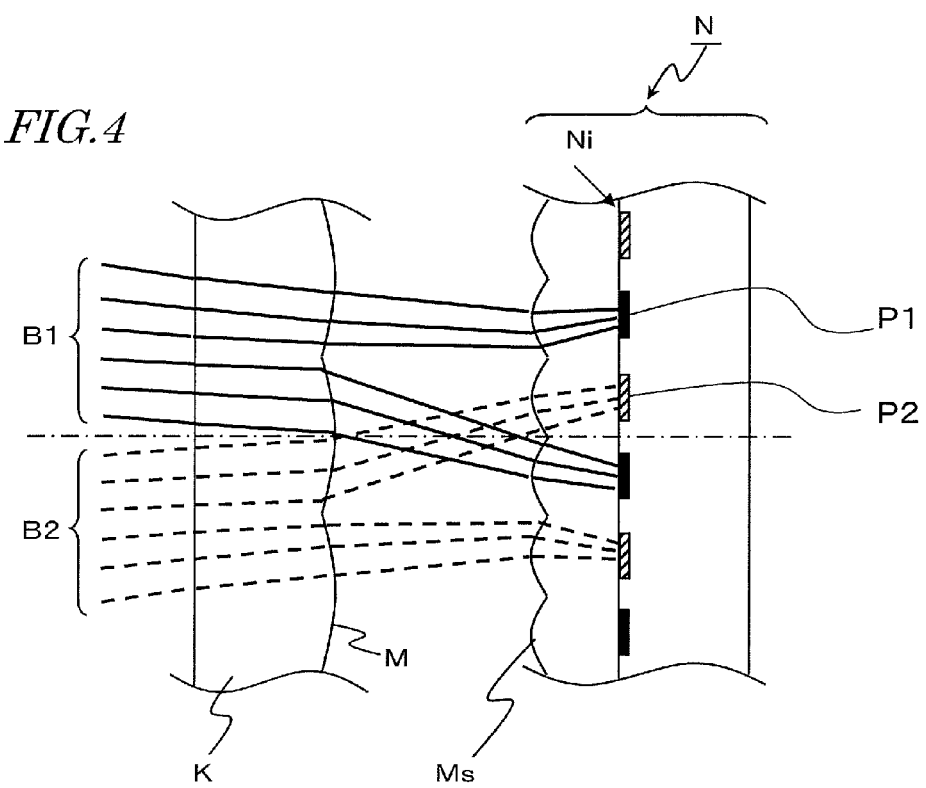
FIG. 4 A schematic enlarged cross-sectional view illustrating the array of optical elements and an image sensor according to the first embodiment and their surrounding.

FIG. 4 is an enlarged view of the array of optical elements K and image sensor N shown in FIG. 1. The array of optical elements K, implemented as a lenticular lens, is arranged so that its side with the optical elements M faces the image sensor N. As shown in FIG. 1, the array of optical elements K is arranged in the vicinity of the focal point of the lens optical system L and is located at a predetermined distance from the image sensor N. The image sensor N includes a plurality of first pixels P1 and a plurality of second pixels P2, which are arranged on the image capturing plane Ni. A number of those first pixels P1 are arranged in the horizontal direction (i.e., the first direction), so are a number of those second pixels P2. As shown in FIG. 4, those first pixels P1 and second pixels P2 are arranged alternately in the vertical direction (i.e., the second direction).

In this embodiment, each and every one of the first pixels P1 and second pixels P2 has the same shape on the image capturing plane Ni. For example, each of the first pixels P1 and second pixels P2 may have the same rectangular shape and may have the same area, too.

The image sensor N may include a plurality of micro lenses Ms, which are arranged on the image capturing plane Ni so as to cover the surface of the respective pixels. The position at which the array of optical elements K is arranged may be determined by reference to the focal point of the objective lens L1, for example. One period in the vertical direction of the cylindrical faces of the array of optical elements K corresponds to two of the pixels arranged on the image capturing plane Ni.

As shown in FIG. 4, the boundary between two adjacent cylindrical faces of the array of optical elements K is level in the horizontal direction with the boundary between two adjacent micro lenses Ms of the image sensor N. That is to say, the array of optical elements K and the image sensor N are arranged so that each single optical element M of the array of optical elements K corresponds to two rows of pixels on the image capturing plane Ni. Each optical element M has the function of selectively determining the outgoing direction of an incoming light ray according to its angle of incidence. Specifically, the optical elements M makes most of the light beam B1 that has been transmitted through the first optical region D1 incident onto the first pixels P1 on the image capturing plane Ni and also makes most of the light beam B2 that has been transmitted through the second optical region D2 incident onto the second pixels P2 on the image capturing plane Ni. This can be done by adjusting the refractive index of the lenticular lens used as the array of optical elements K, the radius of curvature of the optical elements M, and the distance from the image capturing plane Ni.

The image sensor N photoelectrically converts the incident light and transmits an image signal Q0 to the signal processing section C. Based on the image signal Q0, the signal processing section C generates image signals Q1 and Q2 corresponding to the first pixels P1 and the second pixels P2, respectively.

The image signal Q1 represents an image that has been produced by the light beam transmitted through the first optical region D1, while the second image signal Q2 represents an image that has been produced by the light beam transmitted through the second optical region D2. Since the first and second optical regions D1 and D2 transmit light beams vibrating in the directions of the first and second polarization axes, respectively, two images represented by two linearly polarized light components with mutually different polarization directions can be obtained.

These two images obtained in this manner have been shot at a time through the single lens optical system. That is why since the same object has been shot substantially at the same time from the same angle, there is no significant difference between the two images except that those two images are represented by light beams in mutually different polarization states. However, as a light beam coming from the object has a polarization property which is determined by various kinds of information about the surface roughness, reflectance and birefringence of an object and the orientation of the reflective surface, those pieces of information about the surface roughness, reflectance and birefringence of an object and the orientation of the reflective surface are more enhanced in one of the two images than in the other. As a result, an image representing a scene under the water clearly can be obtained with the reflection from the surface of water suppressed, or an image representing even a center line on a wet road surface clearly can also be obtained. On top of that, by processing the two image signals by various known image processing techniques, images including those pieces of information about the surface roughness, reflectance and birefringence of an object and the orientation of the reflective surface can be obtained.

As can be seen, the image sensor of this embodiment can obtain two images represented by light beams with mutually different polarization properties at a time by using a general purpose image sensor. Since such images can be obtained by the split polarizer which is arranged in the vicinity of the stop, a practical resolution can be maintained without increasing the size of the image capture device too much.

Optionally, the lens optical system L of this embodiment may be an image-space telecentric optical system. In that case, principal rays of light beams entering at different angles of view can also be incident on the array of optical elements at an angle of incidence of nearly zero degrees. As a result, crosstalk (i.e., incidence of light rays that should have been incident on the first pixels P1 on the second pixels P2 or incidence of light rays that should have been incident on the second pixels P2 on the first pixels P1) can be reduced over the entire image sensor.

The stop S is a region through which a bundle of rays with every angle of view passes. That is why by inserting a plane, of which the optical property controls the polarization property, to the vicinity of the stop S, the polarization property of a bundle of rays with any angle of view can be controlled in the same way. Specifically, in this embodiment, the split polarizer Sp may be arranged in the vicinity of the stop S. By arranging the split polarizer Sp in the optical regions D1 and D2 that are located in the vicinity of the stop, a polarization property corresponding to the number of the divided regions can be given to the bundle of rays.

In FIG. 1, the split polarizer Sp is arranged at such a position that the light that has passed through the stop S can enter the split polarizer Sp directly (i.e., without passing through any other optical member). Optionally, the split polarizer Sp may be arranged closer to the object than the stop S is. In that case, the light that has passed through the split polarizer Sp may enter the stop S directly (i.e., without passing through any other optical member). In the case of an image-space telecentric optical system, the angle of incidence of a light ray at the focal point of the optical system is determined unequivocally by the position of the light ray that passed through the stop S. Also, the array of optical elements K has the function of selectively determining the outgoing direction of an incoming light ray according to its angle of incidence. That is why the bundle of rays can be distributed onto pixels on the image capturing plane Ni so as to correspond to the optical regions D1 and D2 which are divided in the vicinity of the stop S.

On the other hand, in the case of an image-space non-telecentric optical system, the angle of incidence of a light ray at the focal point of the optical system is determined unequivocally by the position of the light ray that passed through the stop S and the angle of view.

(Embodiment 2)

A second embodiment of an image capture device according to the present invention will be described. In the image capture device of this embodiment, the lens optical system has first through fourth optical regions and micro lenses are arranged as an array of optical elements, unlike the image capture device of the first embodiment. Thus, the following description of this embodiment will be focused on these differences from the first embodiment.

Figure 5:
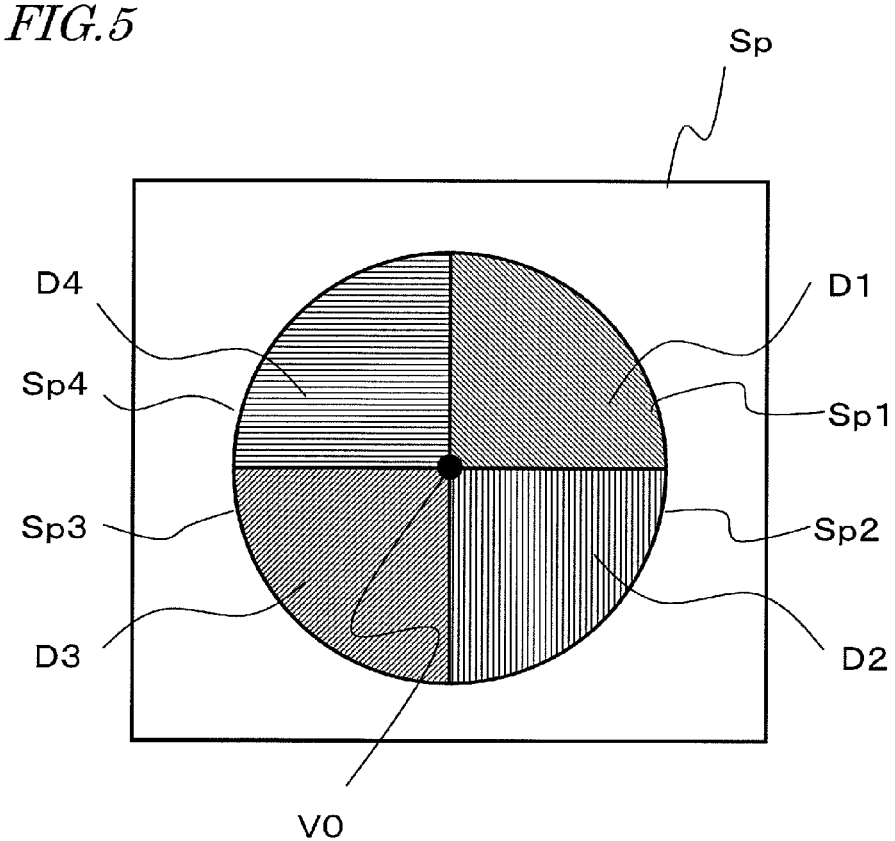
FIG. 5 A front view of a split polarizer according to a second embodiment.

In this embodiment, the lens optical system L has a first optical region which transmits mostly light vibrating in the direction of a first polarization axis, a second optical region which transmits mostly light vibrating in the direction of a second polarization axis that is different from the direction of the first polarization axis, a third optical region which transmits mostly light vibrating in the direction of a third polarization axis, and a fourth optical region which transmits mostly light vibrating in the direction of a fourth polarization axis. FIG. 5 illustrates an example of a split polarizer Sp to be arranged in these four optical regions. The split polarizer Sp shown in FIG. 5 is viewed from the object side. The split polarizer Sp has first, second, third and fourth polarizing portions Sp1, Sp2, Sp3 and Sp4 which are located in the first, second third and fourth optical regions D1, D2, D3 and D4, respectively.

The boundary between the first and second optical regions D1 and D2 and the boundary between the third and fourth optical regions D3 and D4 are located on a plane which includes the optical axis V0 of the lens optical system L and which is parallel to the horizontal direction of the image capture device. On the other hand, the boundary between the first and fourth optical regions D1 and D4 and the boundary between the second and fourth optical regions D2 and D4 are located on a plane which includes the optical axis V0 of the lens optical system L and which is parallel to the vertical direction of the image capture device.

The direction of the third polarization axis may be either different from the directions of the first and second polarization axes or the same as the direction of the first or second polarization axis. Likewise, the direction of the fourth polarization axis may be either different from, or the same as, the directions of the first and second polarization axes. That is to say, any two of the first, second, third and fourth polarizing portions Sp1, Sp2, Sp3 and Sp4 need to have mutually different polarization directions. Also, if the directions of the first through fourth polarization axes are different from each other, then the directions of the first through fourth polarization axes may be three directions that define angles of 45, 90 and 135 degrees with respect to one direction, for example.

Figure 6:
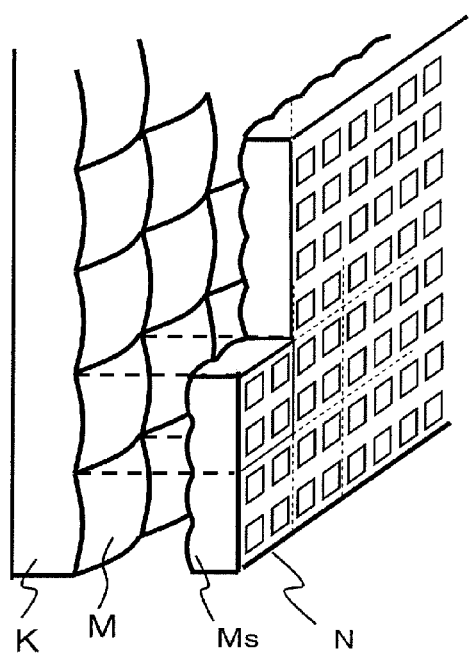
FIG. 6 A schematic perspective view illustrating an array of optical elements and an image sensor according to the second embodiment and their surrounding.

FIG. 6 is a partially cutaway perspective view of the array of optical elements K and image sensor N. In this embodiment, the optical elements M of the array of optical elements K are micro lenses, and the lens surface is a spherical one. The optical elements M are arranged periodically in vertical and horizontal directions, thereby forming a micro lens array. The image sensor N is arranged so as to face the array of optical elements K. Each of the pixels on the image capturing plane Ni of the image sensor N is provided with a micro lens Ms. One period of the optical elements M of the array of optical elements K is set to be twice as long as one period of the micro lenses Ms of the image capture device N both horizontally and vertically. That is why a single optical element M of the array of micro lenses that form the array of optical elements K is associated with four pixels on the image capturing plane Ni.

Figure 7:
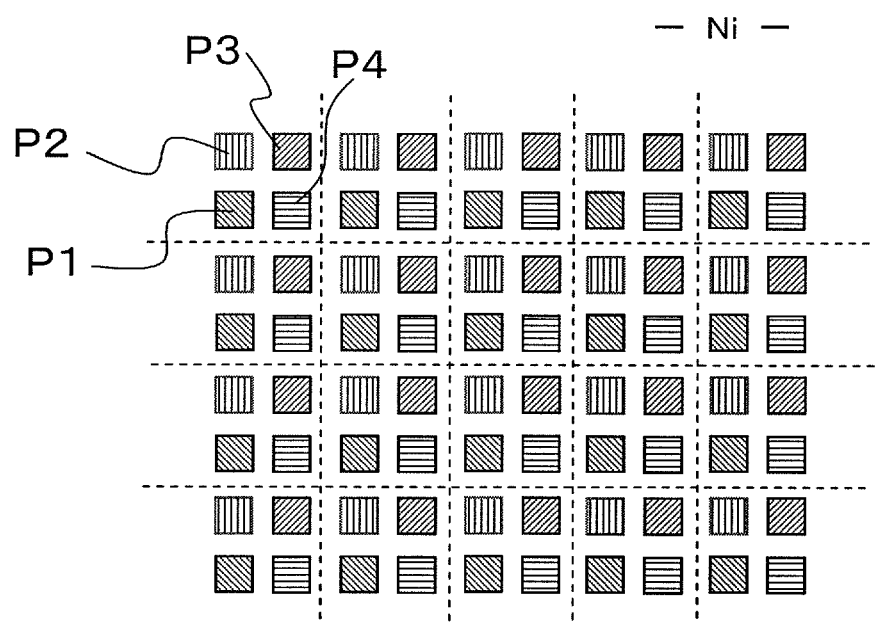
FIG. 7 Illustrates light rays to be incident on the image capturing plane according to the second embodiment.

FIG. 7 illustrates relations between pixels arranged on the image capturing plane of the image sensor N and light rays that have been transmitted through the four optical regions of the lens optical system L. The image sensor N includes a plurality of first pixels P1, a plurality of second pixels P2, a plurality of third pixels P3 and a plurality of fourth pixels P4, all of which are arranged on the image capturing plane Ni. As shown in FIG. 7, on the image capturing plane Ni, the second and third pixels P2 and P3 are arranged horizontally alternately, and the first and fourth pixels P1 and P4 are arranged horizontally alternately. The rows on which the second and third pixels P2 and P3 are arranged and the rows on which the first and fourth pixels P1 and P4 are arranged alternate so that the first and second pixels P1 and P2 are vertically adjacent to each other. Thus, the first, second third and fourth pixels P1, P2, P3 and P4 are arranged so as to be adjacent to each other in the row and column directions, and each set of those four pixels corresponds to a single optical element M of the micro lens array.

A light ray that has been transmitted through the first polarizing portion Sp1 in the first optical region D1 is converged by the lens optical system L and then incident on the first pixel P1 through an optical element M of the array of optical elements K. In the same way, light rays that have been transmitted through the second, third and fourth polarizing portions Sp2, Sp3 and Sp4 in the second, third and fourth optical regions D2, D3 and D4 are incident on the second, third and fourth pixels P2, P3 and P4, respectively. That is to say, light rays that have been transmitted through each optical region are incident on the same kind of pixels which are located every other row in the horizontal direction and every other column in the vertical direction on the image capturing plane Ni.

The image sensor N photoelectrically converts the incident light on a pixel-by-pixel basis and outputs a signal thus obtained to the signal processing section C, which processes the signals obtained from the first, second, third and fourth pixels P1, P2, P3 and P4 on each kind of pixels basis, thereby generating image signals. Specifically, by processing the signals obtained from a number of first pixels P1, the signal processing section C generates an image signal Q1. In the same way, by processing signals obtained from a number of second pixels P2, signals obtained from a number of third pixels P3, and signals obtained from a number of fourth pixels P4, the signal processing section C generates image signals Q2, Q3 and Q4, respectively.

The image signals Q1, Q2, Q3 and Q4 thus obtained represent Images #1, #2, #3 and #4 of the same scene which have been shot at the same time through a single lens system. However, these Images #1, #2, #3 and #4 have been generated based on light beams in mutually different polarization states. That is why these Images #1, #2, #3 and #4 include various pieces of information about the surface roughness, reflectance and birefringence of an object and the orientation of the reflective surface due to their difference in polarization property. In this manner, according to this embodiment, images in four different polarization states can be shot by performing a shooting session only once.

(Embodiment 3)

Figure 8:
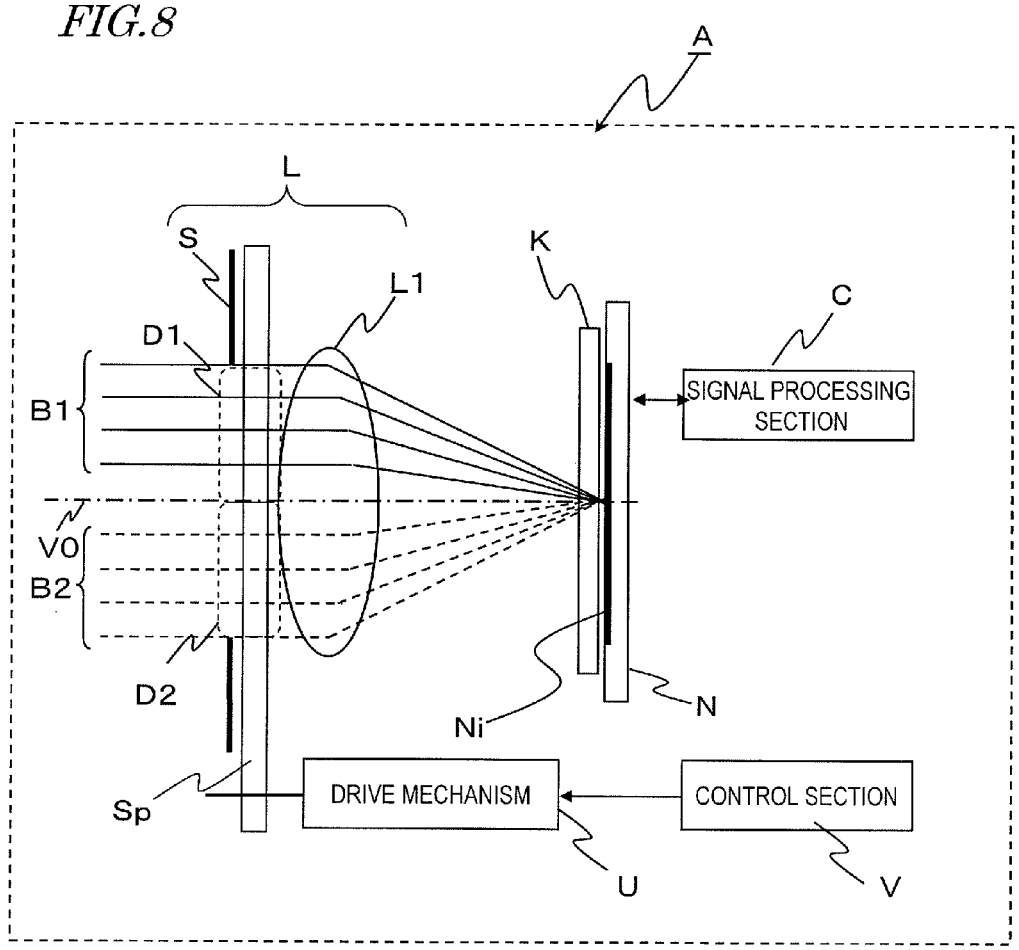
FIG. 8 Illustrates a configuration according to a third embodiment.

A third embodiment of an image capture device according to the present invention will be described. FIG. 8 is a schematic representation illustrating an image capture device according to this third embodiment. The image capture device of this embodiment further includes a polarization direction changing section which changes the direction of at least one of the first and second polarization axes of the first and second optical regions, which is a major difference from the image capture device of the first embodiment. More specifically, in this embodiment, the split polarizer Sp is a switching type split polarizer Sp which can change the directions of the first and second polarization axes of the first and second optical regions, and includes, as the polarization direction changing section, a drive mechanism U to change the direction of the polarization axes and a control section V which controls the operation of the drive mechanism U. Thus, the following description of this third embodiment will be focused on these differences from the first embodiment.

Figure 9:
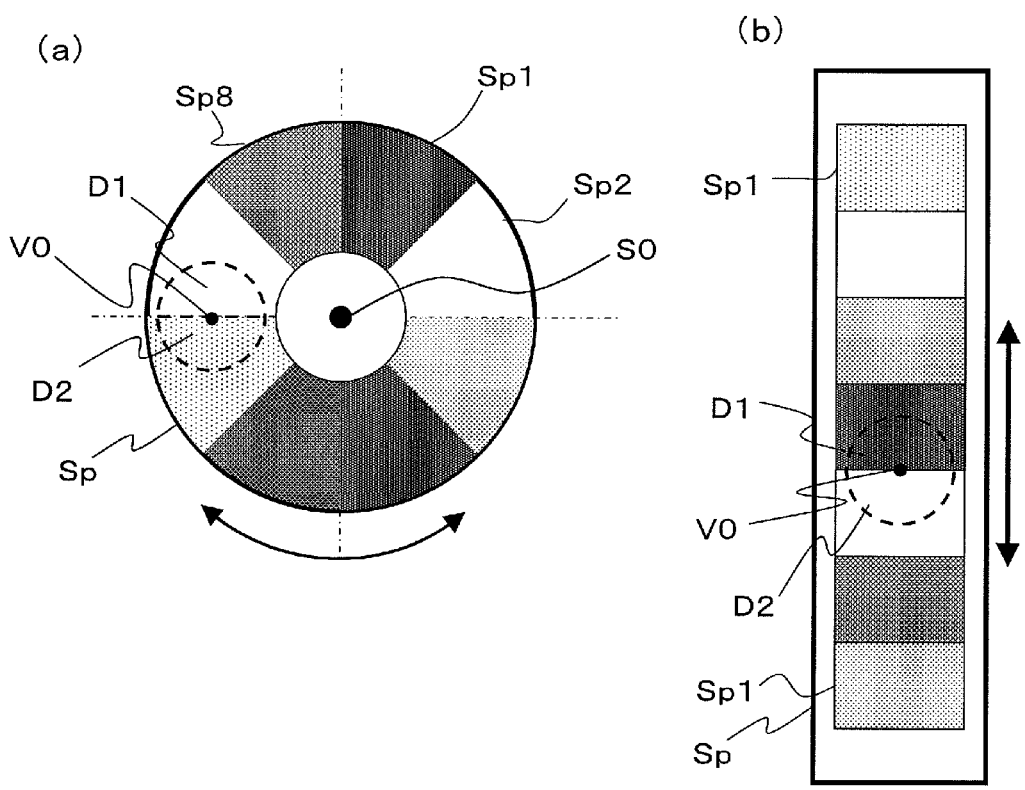
FIGS. 9 (a) is a front view of a split polarizer according to the third embodiment and (b) is a front view illustrating another example of the split polarizer.

The switching type split polarizer Sp of this embodiment has least three polarizing portions, two adjacent ones of which have polarization axes in mutually different directions. FIG. 9(a) illustrates an example of such a split polarizer Sp. The split polarizer Sp shown in FIG. 9 has first through eighth polarizing portions Sp1 through Sp8, which all have a fan shape and which are arranged around the center of rotation S0. The polarization axes of the first through eighth polarizing portions Sp1 through Sp8 are defined so that the polarization axes are different from each other at least between adjacent polarizing portions with respect to the boundary between them, for example.

In accordance with a signal supplied from the control section V, the drive mechanism U rotates the split polarizer Sp on the center of rotation S and stops rotating the split polarizer Sp at a position where the boundary between adjacent polarizing portions overlaps with the optical axis V0 of the lens optical system L. In this manner, two polarizing portions with mutually different polarization axis directions can be arranged in the first and second optical regions D1 and D2. In addition, since the polarizing portions to be arranged in the first and second optical regions D1 and D2 can be selected from the first through eighth polarizing portions Sp1 through Sp8, the polarization axis directions in the first and second optical regions D1 and D2 can be selected arbitrarily from a predetermined combination.

According to such a configuration, by selecting arbitrary polarizing portions according to the condition on which the object needs to be shot, the polarization axis directions in the first and second optical regions D1 and D2 can be switched. As a result, polarized images can be shot adaptively to an even broader range of shooting environments.

The switching type split polarizer does not have to have the configuration shown in FIG. 9(a) but may also be modified in various manners. For example, first through seventh polarizing portions Sp1 through Sp7 may be arranged linearly as shown in FIG. 9(b) and the drive mechanism U may move the polarizing portions in the direction in which they are arranged. Also, although the drive mechanism U and the control section V can change the polarization axis directions of the first and second optical regions D1 and D2 according to this embodiment, one of these two polarization axis directions does not have to be changed. Specifically, even though the polarizing portions to be arranged in the first and second optical regions D1 and D2 are switched by the drive mechanism in this embodiment, the polarizing portion arranged in one of the first and second optical regions D1 and D2 may be fixed and only the polarizing portion to be arranged in the other by the drive mechanism may be switched.

(Embodiment 4)

A fourth embodiment of an image capture device according to the present invention will be described. The image capture device of this embodiment can also change the directions of the first and second polarization axes of the first and second optical regions, which is a major difference from the image capture device of the first embodiment. More specifically, in this embodiment, the split polarizer is comprised of a liquid crystal element and a control section which functions as the polarization direction changing section. Thus, the following description of this fourth embodiment will be focused on these differences from the first embodiment.

Figure 10:
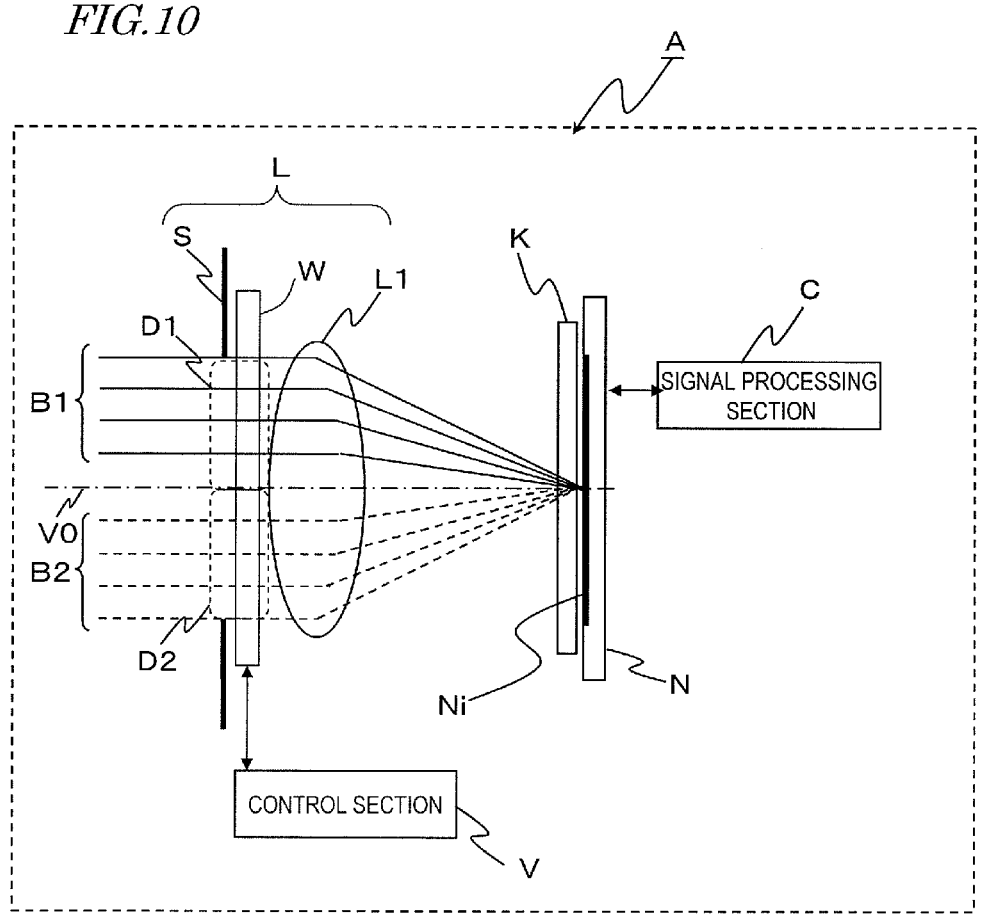
FIG. 10 Illustrates a configuration according to a fourth embodiment.

FIG. 10 illustrates a configuration for an image capture device according to this embodiment. The image capture device shown in FIG. 10 includes a liquid crystal element W and a control section V as a split polarizer.

Figure 11:
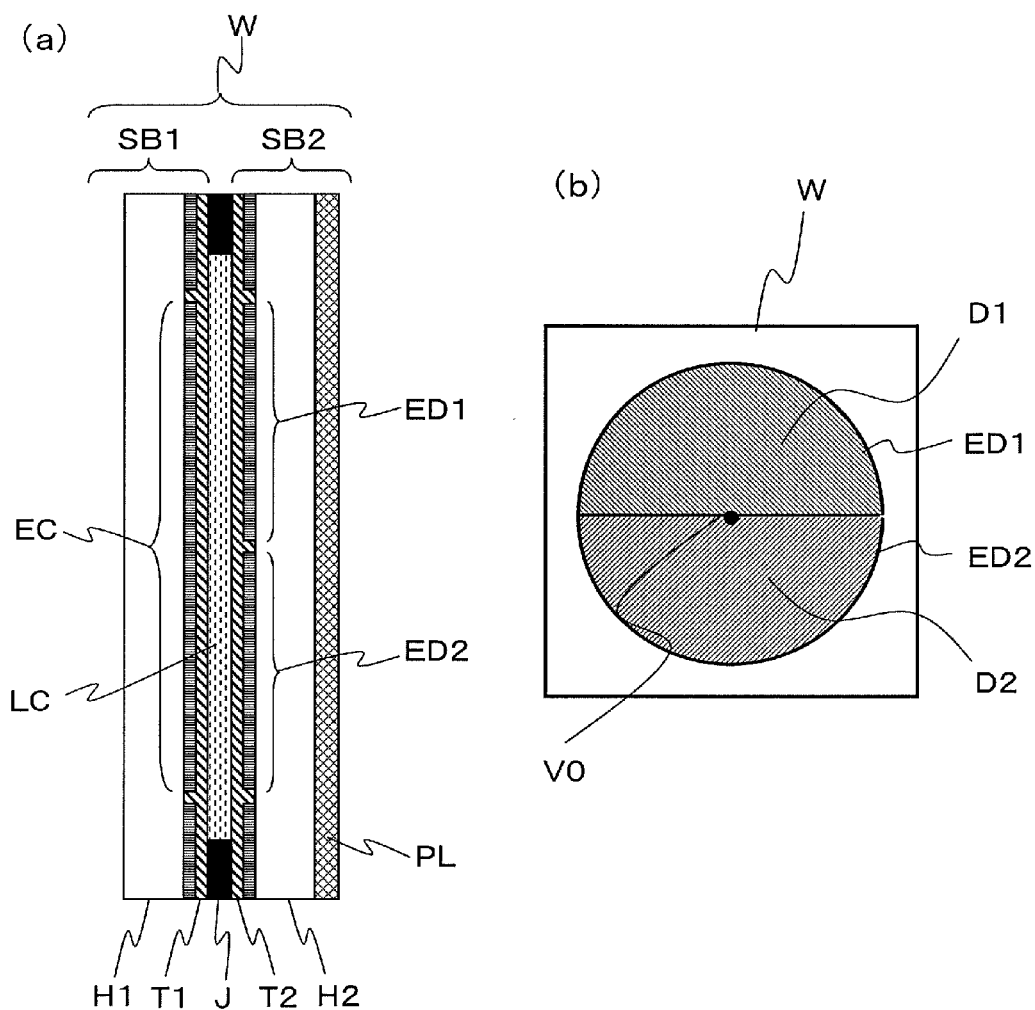
FIGS. 11 (a) and (b) are respectively a cross-sectional view and a front view of a liquid crystal element according to the fourth embodiment.

FIG. 11(a) is a cross-sectional view generally illustrating the structure of the liquid crystal element W and FIG. 11(b) is a front view thereof. The liquid crystal element W includes a common transparent electrode EC, a liquid crystal layer LC, divided transparent electrodes ED1, ED2 and a polarizing plate PL.

The common transparent electrode EC is arranged on a glass substrate H1 with an alignment film T1, thus forming a substrate SB1. On the other hand, the divided transparent electrodes ED1 and ED2 are arranged on a glass substrate H2 with an alignment film T2. On the other side of the substrate SB2 with no divided transparent electrodes ED1, ED2, arranged is the polarizing plate PL, which has a polarization axis and which transmits light vibrating in the direction of the polarization axis. The alignment direction of the alignment film T2 agrees with the polarization axis of the polarizing plate PL. The liquid crystal layer LC is interposed between the two substrates SB1 and SB2 that are bonded together with a seal member J.

As shown in FIG. 11(b), the divided transparent electrodes ED1 and ED2 are arranged so that their boundary agrees with the horizontal direction that passes through the optical axis V0 of the lens optical system L. In this manner, the divided transparent electrodes ED1 and ED2 are arranged in the first and second optical regions D1 and D2, respectively. The control section V applies a voltage to between the common transparent electrode EC and the divided transparent electrodes ED1, ED2.

The liquid crystal layer LC has an optical rotatory characteristic and comes to have an angle of optical rotation according to the voltage applied between the common transparent electrode EC and the divided transparent electrodes ED1, ED2. For example, the liquid crystal layer LC may have an angle of optical rotation of 90 or 180 degrees according to the voltage applied. That is why if the voltages applied to the divided transparent electrodes ED1 and ED2 are different, then the liquid crystal layer LC interposed between the common transparent electrode EC and the divided transparent electrode ED1 and the liquid crystal layer LC interposed between the common transparent electrode EC and the divided transparent electrode ED2 come to have different angles of rotation of light.

The light beam that has entered this liquid crystal element W has its polarization direction rotated due to the optical rotatory characteristic of the liquid crystal layer LC and then is incident on the polarizing plate PL. In this case, the angle of optical rotation, i.e., the angle of rotation of the polarization axis, varies according to the voltage applied by the control section V to the divided transparent electrodes ED1 and ED2, as described above. The polarizing plate PL transmits only a component of the light transmitted through the liquid crystal layer LC if the component is a linearly polarized light ray that is parallel to the polarization axis of the polarizing plate PL. As a result, only a linearly polarized light ray that has rotated to the angle of optical rotation to be determined by the voltages applied to the divided transparent electrodes ED1 and ED2 and that vibrates in the same direction as the polarization axis of the polarizing plate PL is transmitted through the liquid crystal element W and detected at the image sensor N. That is why the polarization direction of the light ray going out of the liquid crystal element W is the same, no matter whether the light ray has been transmitted through the divided transparent electrode ED1 or the divided transparent electrode ED2. However, since those light rays have rotated to different angles of optical rotation through the liquid crystal layer LC, the polarization directions of the light rays going out of the liquid crystal element W and incident on the lens optical system L are different between the divided transparent electrodes ED1 and ED2, i.e., between the first and second optical regions D1 and D2. That is to say, by making the linearly polarized light rays to be transmitted through the divided transparent electrodes ED1 and ED2 have mutually different polarization axis directions and by regulating the voltage applied, their polarization directions can be changed substantially.

As can be seen, according to this embodiment, two images represented by light beams in mutually different polarization states can be obtained at a time. In addition, since the angle of optical rotation of the liquid crystal layer LC can be adjusted by regulating the applied voltage, the polarization condition of the light representing the image can be changed according to the shooting environment. Consequently, the image capture device of this embodiment can cope with an even broader range of shooting environments.

In addition, since the polarization axis of the split polarizer can be switched without using any mechanical driving section, the switching operation can get done at high speeds. Therefore, it is possible to perform a shooting session under a predetermined polarization condition and then perform another shooting session for a short time under a different polarization condition. For example, if an organism needs to be shot in three or more different polarization states, the number of images obtained can be twice as large as the number of times of shooting sessions by performing the shooting sessions a number of times at short intervals.

Although the liquid crystal element includes two divided transparent electrodes in the embodiment described above, the liquid crystal element may also include four divided transparent electrodes to be arranged in four optical regions as in the second embodiment described above. In that case, micro lenses may be used as the array of optical elements as in the second embodiment described above. Then, four images represented by light beams in four different polarization states can be obtained.

(Embodiment 5)

A fifth embodiment of an image capture device according to the present invention will be described. In the image capture device of this embodiment, the image sensor is a color image sensor with an arrangement of pixels on which color filters are arranged in a Bayer arrangement, and the array of optical elements K is a lenticular lens with a different shape from its counterpart of the first embodiment, which are major differences from the image capture device of the first embodiment. Thus, the following description of this fifth embodiment will be focused on these differences from the first embodiment.

In a color image sensor with a Bayer arrangement, pixels are arranged to form a tetragonal lattice, and pixels with green color filters (having first and second spectral transmittance characteristics), among those pixels, are arranged so as to be diagonally adjacent to each other and have a density that is approximately a half as high as that of all pixels. On the other hand, pixels with red and blue color filters (having third and fourth spectral transmittance characteristics) are arranged evenly as a density that is a half as high as that of the green pixels. More specifically, although there are green pixels on each row and each column (i.e., both on odd- and even-numbered columns and on odd- and even-numbered rows), red and blue pixels are present on either odd- or even-numbered columns and on either odd- or even-numbered rows. That is why if the array of optical elements K has the same structure as the counterpart of the first embodiment (i.e., implemented as a lenticular lens), information about the color blue is missing from one of the two images represented by light beams that have been transmitted through the first and second optical regions D1 and D2 and information about the color red is missing from the other image.

Figure 12:
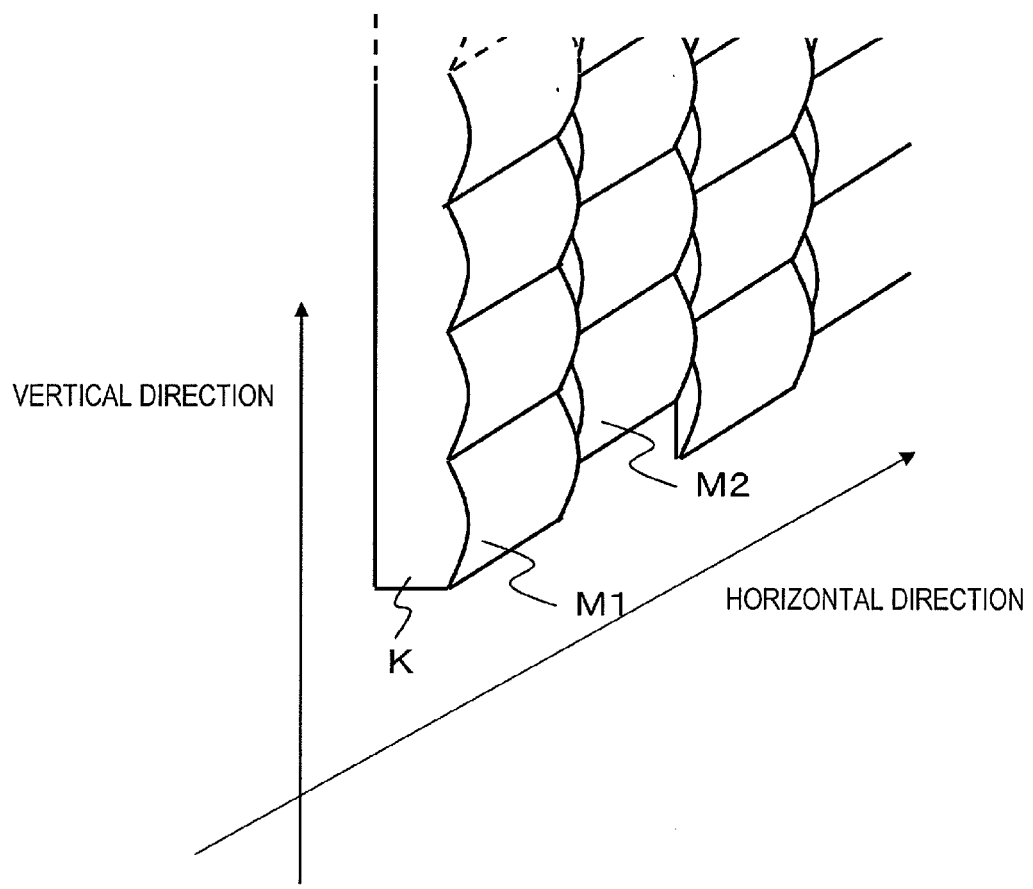
FIG. 12 A perspective view of an array of optical elements according to a fifth embodiment.

Thus, to achieve the same effect as in the first embodiment even when such a color image sensor with a Bayer arrangement is used, the shape of the array of optical elements K is modified according to this embodiment. FIG. 12 is a perspective view illustrating the array of optical elements K according to this embodiment as viewed from the image side. This array of optical elements K includes a plurality of optical elements M1 and M2. In each set of optical elements M1, M2, a number of cylindrical lenses, each running horizontally (i.e., in the first direction), are arranged vertically (i.e., in the second direction) linearly. Each set of those optical elements M1, M2 forms a column running vertically, and columns of the optical elements M1 and columns of the optical elements M2 are alternately arranged horizontally. In a column of optical elements M1 and a column of optical elements M2 which are horizontally adjacent to each other, each optical element on one column is vertically shifted from an associated optical element on the other column by a length corresponding to a half of one vertical arrangement period.

Each of these optical elements M1 and M2 is associated with four pixels with red, blue and green filters, which are arranged in a Bayer arrangement pattern to form the image capturing plane of the image sensor, and makes the light that has been transmitted through the lens optical system L incident on four pixels that face the optical element. That is to say, the cylindrical surface that is the lens surface of each optical element M1, M2 has one period corresponding to two pixels of the image sensor N both vertically and horizontally. That is why in two horizontally adjacent columns of optical elements M1 and M2, each optical element on one column is vertically shifted by one pixel from an associated optical element on the other column.

As in the first embodiment, thanks to the action of the lenticular lens consisting of these optical elements M1 and M2, light rays that have been transmitted through the first and second optical regions D1 and D2 are incident on mutually different pixels. An optical element on one column of optical elements M1 is vertically shifted by a half period from an associated optical element on an adjacent column of optical elements M2. That is why the light rays coming from the first and second optical regions D1 and D2 are incident on the pixels of the image sensor with odd- and even-numbered rows changed every two pixels.

Figure 13:
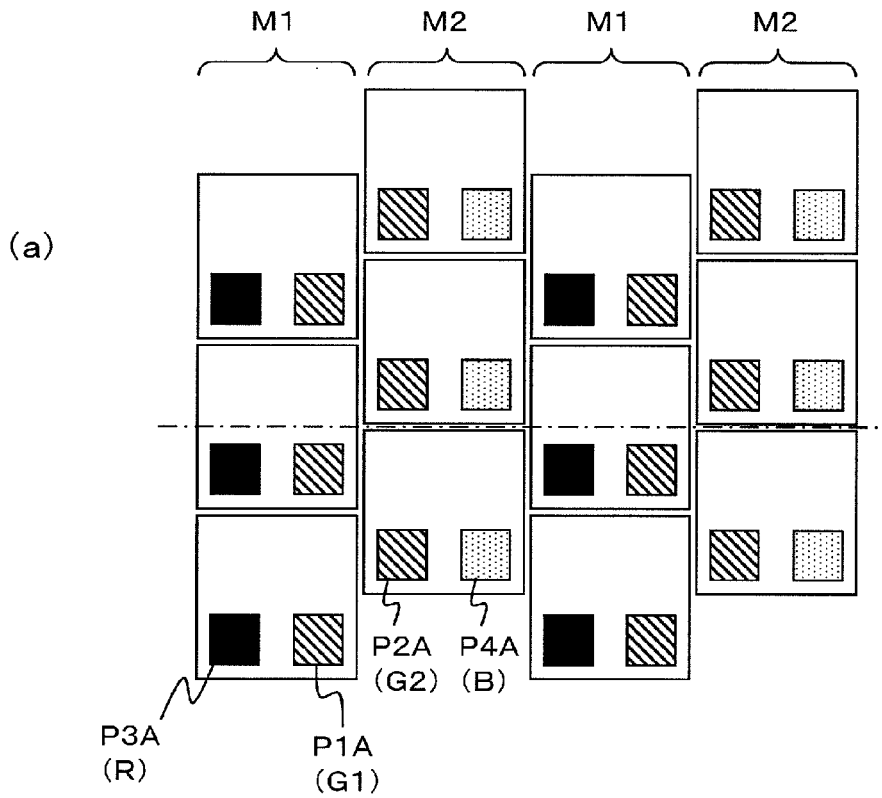
FIGS. 13 (a) and (b) illustrate how light rays are incident on an image sensor according to the fifth embodiment.
Figure 13:
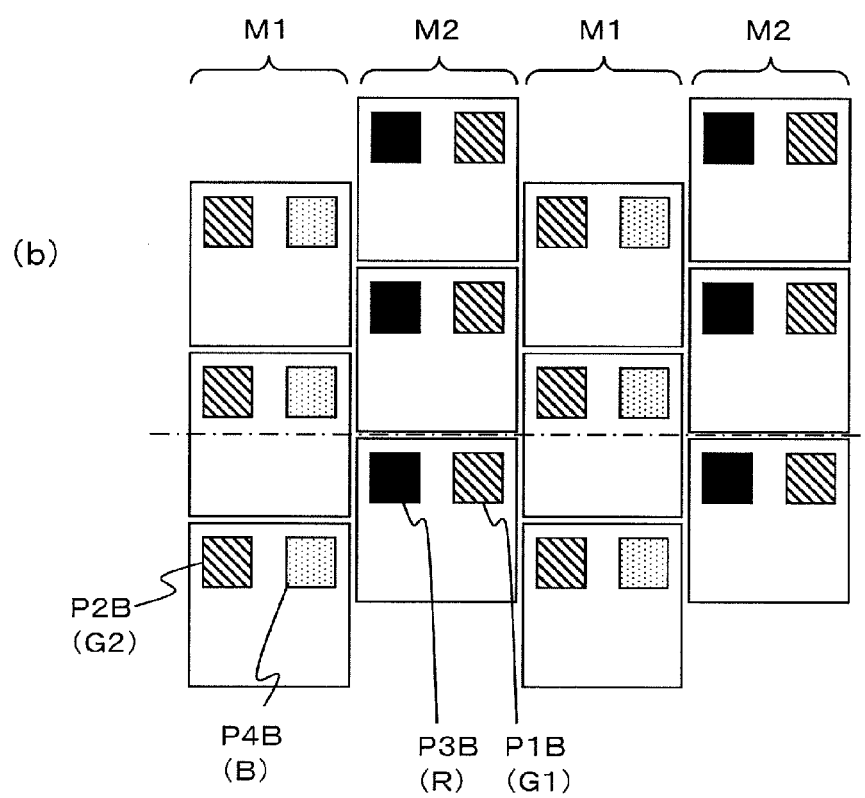

FIGS. 13(a) and 13(b) are schematic representations illustrating light rays incident on the image capturing plane Ni of the image sensor N of this embodiment. In FIGS. 13(a) and 13(b), pixels to which the light rays transmitted through the first optical region D1 are led are shown in FIG. 13(a) and pixels to which the light rays transmitted through the second optical region D2 are led are shown in FIG. 13(b) for the sake of simplicity.

As shown in these drawings, on each column of optical elements M1, the optical elements M1 lead the light rays coming from the first optical region D1 onto green (G1) pixels P1A and red (R) pixels P3A and also leas the light rays coming from the second optical region D2 onto green (G2) pixels P2B and blue (B) pixels P4B. On the other hand, on each column of optical elements M2, the optical elements M2 lead the light rays coming from the first optical region D1 onto green (G2) pixels P2A and blue (B) pixels P4A and also leas the light rays coming from the second optical region D2 onto green (G1) pixels P1B and red (R) pixels P3B.

The signal processing section C receives signals from the pixels of the image sensor N on which the light rays coming from the first optical region D1 have been incident (as shown in FIG. 13(a)) and signals from the pixels on which the light rays coming from the second optical region D2 have been incident (as shown in FIG. 13(b)) and processes those two groups of signals separately from each other, thereby generating two images. The signals received from the pixels on which the light rays coming from the first optical region D1 have been incident (as shown in FIG. 13(a)) and the signals received from the pixels on which the light rays coming from the second optical region D2 have been incident (as shown in FIG. 13(b)) each include signals received from the red, blue and green pixels. As a result, color images generated by light rays in mutually different polarization states can be obtained.

As can be seen from FIGS. 13(a) and 13(b), the light rays led by the columns of optical elements M1 are not incident on the green (G2) pixels P2A and blue (B) pixels P4A among the pixels on which the light rays coming from the first optical region D1 are incident (see FIG. 13(a)). In the same way, the light rays led by the columns of optical elements M2 are not incident on the green (G1) pixels P1A and red (R) pixels P3A. That is why when the signal processing section C processes the signals received from the pixels on which the light rays coming from the first optical region D1 have been incident as shown in FIG. 13(a), signals of two missing ones of the four pixels associated with each column of optical elements M1 may be interpolated with signals of two pixels associated with an adjacent column of optical elements M2. In the same way, when the signal processing section C processes the signals received from the pixels on which the light rays coming from the second optical region D2 have been incident as shown in FIG. 13(b), signals of two missing ones of the four pixels associated with each column of optical elements M1 may be interpolated with signals of two pixels associated with an adjacent column of optical elements M2.

Even though the image sensor is supposed to be a color image sensor with a Bayer arrangement in the embodiment described above, pixels with green filters may be vertically adjacent to each other in each set of four pixels. Also, although the image sensor is supposed to include pixels with red, blue and green filters in the embodiment described above, the image sensor may also include pixels with filters in the complementary colors of these colors. For example, in the image sensor, red, blue, green and white filters, red, blue, green and yellow filters, or any other appropriate combination of filters may be provided for each set of four pixels.

(Embodiment 6)

Figure 14:
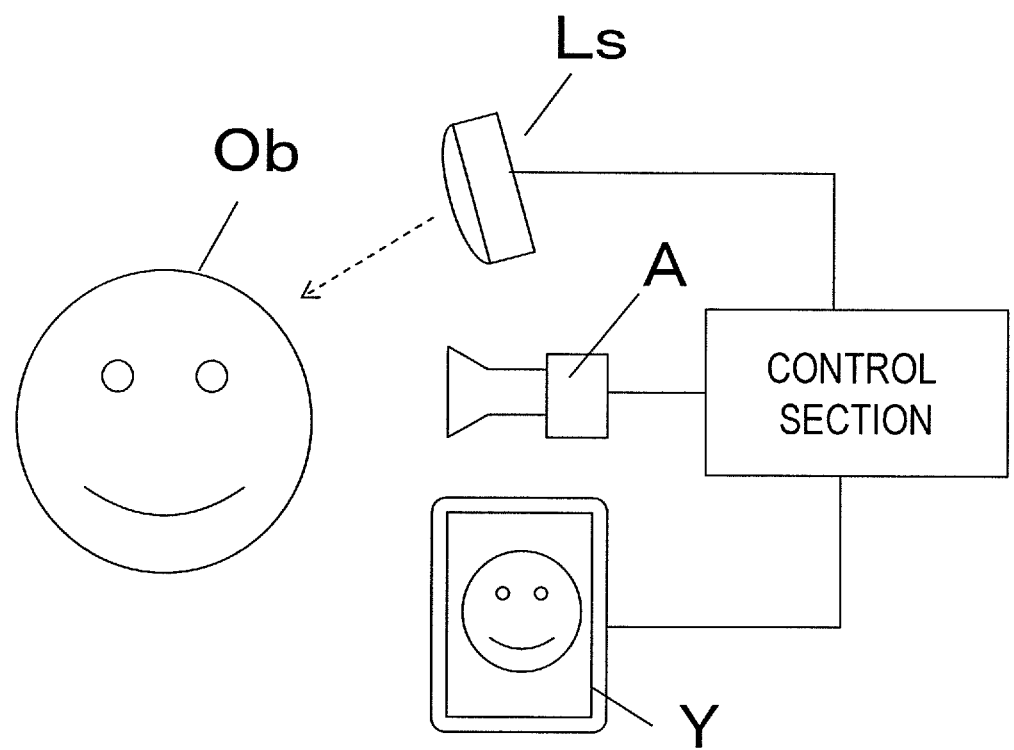
FIG. 14 Illustrates a general configuration for a skin checker according to a sixth embodiment of the present invention.

An embodiment of a skin checker will be described as an exemplary biometric image capturing system that uses an image capture device according to the present invention. FIG. 14 illustrates a general configuration for a skin checker as a sixth embodiment of the present invention. The skin checker of this embodiment includes a light source Ls to illuminate an object Ob, an image capture device A, a display section Y to display an image shot, and a control section which controls all of these.

Figure 15:
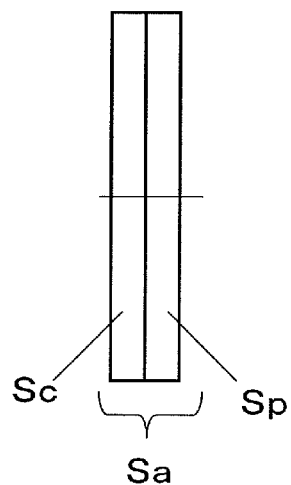
FIGS. 15(a) is a side view of an optical element Sa to be arranged in the vicinity of the stop of a lens optical system according to the sixth embodiment, (b-1) is a front view of split color filters Sc, and (b-2) is a front view of a split polarizer Sp.
Figure 15:
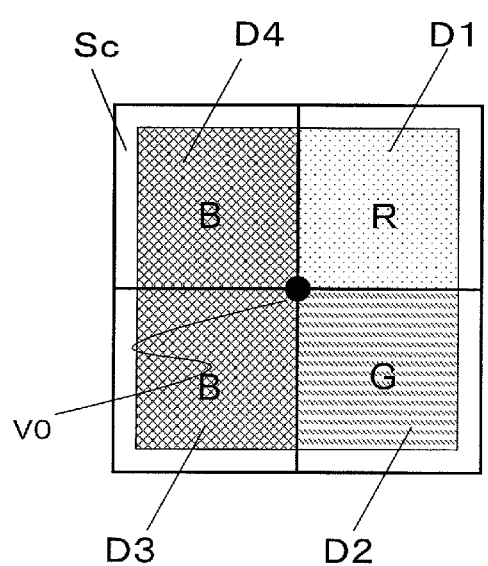
Figure 15:
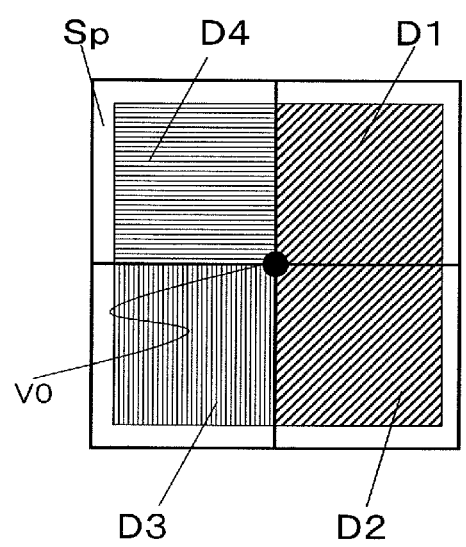

In the image capture device A, the lens optical system includes an optical element Sa including a split polarizer and split color filters, which is a difference from the image capture device of the second embodiment. FIG. 15 illustrates a configuration for the optical element Sa to be arranged in the vicinity of the stop of the lens optical system. FIG. 15(a) is a side view. The optical element Sa includes the split polarizer Sp that has already been described for the second embodiment and split color filters Sc adjacent to the split polarizer Sp. FIG. 15(b-1) is a front view of the split color filters Sc. There are four optical regions D1 to D4 which are arranged around the optical axis V0. A filter which mainly transmits light falling within the color red wavelength range is arranged in the optical region D1. A filter which mainly transmits light falling within the color green wavelength range is arranged in the optical region D2. And a filter which mainly transmits light falling within the color blue wavelength range is arranged in the optical regions D3 and D4. FIG. 15(b-2) is a front view of the split polarizer Sp. There are four optical regions D1 to D4 which are arranged around the optical axis V0. The polarized light transmission characteristics of these regions can be adjusted independently of each other by control means (not shown). For example, the split polarizer Sp may be configured so that polarizers with different polarized light transmission characteristics (such as the directions of their polarization axes) are readily attachable and removable to/from these optical regions D1 to D4.

A polarizer is arranged at the light source Ls to make the light source Ls emit mainly light with a predetermined polarization direction.

The light reflected from skin is a mixture of components of the light that has been reflected from the surface of the skin and components of the light that has been reflected from inside of the skin and that is affected by scattering. Of these two kinds of light, the light reflected from the surface of the skin comes back while keeping the polarization direction of the light source. On the other hand, the light that has been reflected from inside of the skin and affected by scattering no longer keeps the polarization direction of the light source.

In observing skin, if the surface wrinkles or texture of the skin needs to be checked, then the skin observation may be carried out with the polarization directions of the illumination source and the shooting optical system matched to each other by taking advantage of such a characteristic. On the other hand, if spots under the skin surface need to be checked, then the shooting session may be carried out with the polarization directions of the illumination source and the shooting optical system left different from each other.

In this case, when spots are going to be observed, the shorter the wavelength range, the better. That is why it is recommended that the spots be observed with light falling within the color blue wavelength range. Likewise, wrinkles and surface texture can also be observed better with light falling within the color blue wavelength range. That is why the object Ob is suitably shot with light falling within the color blue wavelength range and having two different pieces of polarization information. Thus, in the split polarizer Sp shown in FIG. 15, the optical region D3 of the split polarizer Sp corresponding to the optical region D3 of the split color filters Sc which mainly transmits light falling within the color blue wavelength range has such a polarization property as to mainly transmit polarized light, of which the polarization axis is substantially parallel to that of polarized light mainly emitted from the light source Ls. Likewise, the optical region D4 of the split polarizer Sp corresponding to the optical region D4 which mainly transmits light falling within the color blue wavelength range has such a polarization property as to mainly transmit polarized light, of which the polarization axis intersects at substantially right angles with that of polarized light mainly emitted from the light source Ls. On the other hand, the optical regions D1 and D2 of the split polarizer Sp corresponding to the optical regions D1 and D2 of the split color filters Sc that mainly transmit light falling within the colors green and red wavelength ranges, respectively, have such a polarization property as to mainly transmit polarized light, of which the polarization axis defines a tilt angle of 45 degrees with respect to the polarization axis of the polarized light mainly emitted from the light source Ls.

Consequently, an image which allows the viewer to observe the skin wrinkles and texture easily can be obtained based on the light that has been transmitted through the optical region D3 of the split polarizer Sp. On the other hand, an image which allows the viewer to observe the skin spots more easily can be obtained based on the light that has been transmitted through the optical region D4 of the split polarizer Sp.

Furthermore, components of light reflected from the surface of the skin and components of light reflected from inside of the skin and affected by scattering can be both obtained based on the light that has been transmitted through the optical regions D1 and D2 of the split polarizer Sp.

It should be noted that the polarization axis of the optical regions D1 and D2 does not have to define a tilt angle of 45 degrees with respect to the polarization axis of the light emitted from the light source Ls. Rather the direction of the polarization axis of the optical regions D1 and D2 may be adjusted appropriately depending on how the region of interest is irradiated with the light. For example, in a general shooting situation, there should be not only the light source of the skin checker but also other kinds of environmental light such as a room light and sunlight. That is why if the direct reflection of such environmental light is reduced by appropriately adjusting the polarization axis direction of the shooting optical system, the shooting condition can be further improved.

By synthesizing together the images produced by the light beams that have been transmitted through the optical regions D1 and D2 and that fall within the colors green and red wavelength ranges and the image produced by the light beams that have been transmitted through the optical regions D3 and D4 and that fall within the color blue wavelength range, a color observed image representing the skin can be obtained. These images are synthesized together by the signal processing section C of the image capture device A (see FIG. 1).

The image that has been shot by the image capture device A is subjected to appropriate image processing by the signal processing section C and then presented on the display section Y. In this case, if the signal processing section C performs horizontally inverting processing on the image, a mirror image of the object Ob is presented on the display section Y with its right and left portions inverted. By displaying such an inverted image when a person who is the object is observing his or her own skin, the display section can function as a mirror. As a result, the skin checker of this embodiment can be used as a sort of electronic mirror that can display spots, wrinkles and so on effectively. The skin checker suitably performs such a display operation just like a mirror does, because he or she can recognize his or her spots or wrinkles intuitively in that case while doing a makeup or skincare.

As described above, by adopting the configuration of this embodiment, a skin checker which allows the user to observe his or her own skin spots, wrinkles and texture efficiently and which can obtain a color skin image at the same time is realized.

The image capture device of this embodiment can appropriately adjust the directions of the polarization axes of the respective optical regions D1 through D4 of the split polarizer Sp, and therefore, can arrange the light source Ls appropriately with the influence of environmental light taken into account and set the polarization directions of the split polarizer Sp according to the position of the light source before actually starting to carry out shooting. As a result, an image can be shot with the influence of environmental light further reduced.

Also, under a shooting environment to be seriously affected by environmental light, the influence of the environmental light can be reduced by carrying out shooting synchronously with flickering of the light source Ls. For example, in that case, the difference between an image captured with the light source Ls turned ON and an image captured with the light source Ls turned OFF may be calculated and spots or wrinkles may be checked using the differential image.

In the embodiment described above, of the four optical regions D1 to D4 of the split polarizer Sc, the optical regions D3 and D4 are supposed to transmit a light beam falling within the color blue wavelength range. However, the wavelength range of the light beam to be transmitted through the two optical regions does not have to be the color blue wavelength range. For example, two optical regions may transmit a light beam falling within the color green wavelength range and the other two optical regions may transmit a light beam falling within the color blue wavelength range and a light beam falling within the color red wavelength range, respectively. Such a configuration may be adopted if considering the spectrum distribution of the light source Ls and the spectral sensitivity of the photodiode, it is more advantageous to use a light beam falling within the color green wavelength range rather than a light beam falling within the color blue wavelength range in order to observe skin spots, wrinkles or texture.

(Other Embodiments)

In the embodiments described above, the lens optical system L is supposed to be a single lens. However, the lens optical system may include a compound lens which is a combination of multiple lenses. By using such a compound lens, the optical system can be designed with an increased degree of freedom, and an image with a high resolution can be obtained, which is beneficial.

Optionally, to allow the array of optical elements to split incoming light into multiple light rays as intended, the lens optical system may have image-space telecentricity. However, even if the lens optical system does not have image-space telecentricity, the incoming light can also be split into multiple light rays just as intended by appropriately adjusting one period of the array of optical elements (such as a lenticular lens or a micro lens array) arranged in front of the image sensor according to the angle of emittance of an off-axis principal ray of the lens optical system.

In the embodiment described above, the image capture device is supposed to include a signal processing section C. However, an image capture device according to the present invention does not have to include the signal processing section C. In that case, the output signal of the image sensor may be transmitted to an external device such as a personal computer so that the arithmetic processing that should have been done by the signal processing section C is carried out by the external device instead. That is to say, the present invention may be implemented as a system including the image capture device with the lens optical system L, the array of optical elements K and the image sensor N and an external signal processor.

INDUSTRIAL APPLICABILITY

An image capture device according to the present disclosure can be used effectively as an industrial camera such as a product inspecting camera, a surveillance camera, and an image input camera for information terminals or robots. In addition, the image capture device of the present disclosure may also be used in a digital still camera or a digital camcorder as well.

REFERENCE SIGNS LIST

A image capture device
L lens optical system
L1 objective lens
Ls light source
V0 optical axis of lens optical system L
D1, D2, D3, D4 optical region
S stop
Sp split polarizer
K array of optical elements
M, M1, M2 optical element
N image sensor
Ni image capturing plane
Ms micro lens
Ob object
P1 to P4 pixel
C signal processing section
V control section
U drive mechanism
W liquid crystal element
EC common transparent electrode
ED1, ED2 divided transparent electrode
LC liquid crystal layer
PL polarizer
SB1, SB2 substrate
H1, H2 glass substrate
J seal member
T1, T2 alignment film
P1A to P4A pixel
P1B to P4AB pixel
Y display section

The invention claimed is:

1. An image capture device comprising:
a lens optical system;
an image sensor on which light that has passed through the lens optical system is incident and which includes at least a plurality of first pixels and a plurality of second pixels; and
an array of optical elements which is arranged between the lens optical system and the image sensor and which includes a plurality of optical elements, each having a lens surface,
wherein the lens optical system has a first optical region which transmits mostly light vibrating in the direction of a first polarization axis, a second optical region which transmits mostly light vibrating in the direction of a second polarization axis that is different from the direction of the first polarization axis, a third optical region which transmits mostly light vibrating in the direction of a third polarization axis, and a fourth optical region which transmits mostly light vibrating in the direction of a fourth polarization axis, and
each of the optical elements that form the array of optical elements:
makes the light that has passed through the first optical region incident on the plurality of first pixels and also makes the light that has passed through the second optical region incident on the plurality of second pixels; and
is configured to receive an incoming light ray, transmit the incoming light ray, and selectively determine an outgoing direction of the transmitted incoming light ray according to an angle of incidence of the received incoming light ray;
wherein the first, second, third and fourth optical regions of the lens optical system are arranged on the side opposite to the image sensor with respect to the array of optical elements on the optical path.

2. The image capture device of claim 1, wherein the lens optical system includes a split polarizer having first, second, third and fourth polarizing portions which are located in the first, second, third and fourth regions, respectively.

3. The image capture device of claim 1, wherein the optical elements that form the array of optical elements are a micro lens array.

4. The image capture device of claim 1, wherein the lens optical system further includes a stop, and the first and second optical regions are located in the vicinity of the stop.

5. An image capture device comprising:
a lens optical system;
an image sensor on which light that has passed through the lens optical system is incident and which includes at least a plurality of first pixels and a plurality of second pixels; and an array of optical elements which is arranged between the lens optical system and the image sensor and which includes a plurality of optical elements, each having a lens surface, wherein the lens optical system has a first optical region which transmits mostly light vibrating in the direction of a first polarization axis, a second optical region which transmits mostly light vibrating in the direction of a second polarization axis that is different from the direction of the first polarization axis, a third optical region which transmits mostly light vibrating in the direction of a third polarization axis, and a fourth optical region which transmits mostly light vibrating in the direction of a fourth polarization axis, and each of the optical elements that form the array of optical elements:
  makes the light that has passed through the first optical region incident on the plurality of first pixels and also makes the light that has passed through the second optical region incident on the plurality of second pixels; and
  is configured to receive an incoming light ray, transmit the incoming light ray, and selectively determine an outgoing direction of the transmitted incoming light ray according to an angle of incidence of the received incoming light ray;

wherein the direction of at least one of the third and fourth polarization axes is different from the directions of the first and second polarization axes.

6. The image capture device of claim 5, wherein the lens optical system includes a split polarizer having first, second, third and fourth polarizing portions which are located in the first, second, third and fourth regions, respectively.

7. The image capture device of claim 5, wherein the optical elements that form the array of optical elements are a micro lens array.

8. The image capture device of claim 5, wherein the lens optical system further includes a stop, and the first and second optical regions are located in the vicinity of the stop.

* * * * *